United States Patent
Bardasz

(10) Patent No.: US 8,939,125 B2
(45) Date of Patent: Jan. 27, 2015

(54) METHOD OF OPERATING AN ENGINE USING AN ASHLESS CONSUMABLE LUBRICANT

(75) Inventor: Ewa A. Bardasz, Mentor, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 254 days.

(21) Appl. No.: 13/132,387

(22) PCT Filed: Dec. 3, 2009

(86) PCT No.: PCT/US2009/066479
§ 371 (c)(1),
(2), (4) Date: Aug. 22, 2011

(87) PCT Pub. No.: WO2010/077538
PCT Pub. Date: Jul. 8, 2010

(65) Prior Publication Data
US 2011/0297122 A1    Dec. 8, 2011

Related U.S. Application Data

(60) Provisional application No. 61/120,943, filed on Dec. 9, 2008.

(51) Int. Cl.
| | |
|---|---|
| *F02B 3/00* | (2006.01) |
| *F02B 19/00* | (2006.01) |
| *C10M 133/56* | (2006.01) |
| *F01N 3/021* | (2006.01) |
| *F01N 3/10* | (2006.01) |
| *F02D 41/00* | (2006.01) |
| *F02M 25/06* | (2006.01) |
| *F02M 43/00* | (2006.01) |
| *F01N 3/08* | (2006.01) |
| *F01N 3/20* | (2006.01) |

(52) U.S. Cl.
CPC ............ *C10M 133/56* (2013.01); *F01N 3/021* (2013.01); *F01N 3/103* (2013.01); *F02D 41/0025* (2013.01); *F02M 25/06* (2013.01); *F02M 43/00* (2013.01); *C10M 2205/0285* (2013.01); *C10M 2207/026* (2013.01); *C10M 2209/084* (2013.01); *C10M 2209/102* (2013.01); *C10M 2209/103* (2013.01); *C10M 2215/064* (2013.01); *C10M 2215/28* (2013.01); *C10M 2223/00* (2013.01); *C10N 2230/04* (2013.01); *C10N 2230/06* (2013.01); *C10N 2230/42* (2013.01); *C10N 2230/43* (2013.01); *C10N 2230/45* (2013.01); *C10N 2230/54* (2013.01); *C10N 2240/10* (2013.01); *C10N 2240/102* (2013.01); *C10N 2240/103* (2013.01); *F01N 3/0814* (2013.01); *F01N 3/2066* (2013.01); *Y02T 10/20* (2013.01)
USPC ............. 123/299; 123/1 A; 508/294; 508/459

(58) Field of Classification Search
USPC ......... 123/1 A, 73 AD, 196 R, 275, 276, 299, 123/300; 508/291, 294, 459
See application file for complete search history.

(56) References Cited

U.S. PATENT DOCUMENTS

| | | | |
|---|---|---|---|
| 5,202,036 A * | 4/1993 | Ripple et al. ................... | 508/192 |
| 5,328,620 A * | 7/1994 | Ripple ......................... | 508/372 |
| 5,955,403 A | 9/1999 | Wong | |
| 6,588,393 B2 * | 7/2003 | Chamberlin et al. ..... | 123/196 R |
| 2002/0053334 A1 | 5/2002 | Chamberlin, III | |
| 2005/0198894 A1 * | 9/2005 | Migdal et al. .................. | 44/388 |
| 2006/0025316 A1 | 2/2006 | Covitch | |
| 2006/0079413 A1 * | 4/2006 | Kocsis et al. ................. | 508/287 |
| 2006/0089272 A1 * | 4/2006 | Bardasz ........................ | 508/294 |
| 2006/0183647 A1 * | 8/2006 | Kocsis et al. ................. | 508/287 |
| 2007/0023002 A1 * | 2/2007 | Alger et al. ................... | 123/275 |

FOREIGN PATENT DOCUMENTS

WO     2007/117776     10/2007

OTHER PUBLICATIONS

Corresponding PCT Publication No. 2010/077538 A1 including the PCT Search Report published Jul. 8, 2010.
Written Opinion from corresponding international PCT Application No. PCT/US2009/066479 mailed Feb. 24, 2010.

* cited by examiner

*Primary Examiner* — Thomas Moulis
*Assistant Examiner* — Elizabeth Hadley
(74) *Attorney, Agent, or Firm* — Michele M. Tyrpak

(57) ABSTRACT

The present invention relates to methods of using a low sulfur, low phosphorus, low-ash, zinc free consumable lubricating composition in an internal combustion engine equipped with a pilot ignition system, where the composition comprises: an oil of lubricating viscosity; a high TBN succinimide dispersant and where the lubricant composition overall has a sulfated ash value of up to about 0.2, a phosphorus content of up to about 50 to about 800 ppm and a sulfur content of up to about 0.4 percent by weight.

12 Claims, No Drawings

METHOD OF OPERATING AN ENGINE USING AN ASHLESS CONSUMABLE LUBRICANT

BACKGROUND OF THE INVENTION

The present invention relates to a low sulfur, low phosphorus, low-ash consumable lubricant composition suitable for use in an internal combustion engine (ICE) and methods of using the same.

Over the last twenty years, engine manufactures have achieved remarkable reductions in particulate matter (PM) emissions by significant engine modifications. There is now a need to lubricate these new engines, while maintaining the reduced PM emissions. The low sulfur, low phosphorus, low ash consumable lubricant described herein fulfills this requirement.

Another problem associated with ICE equipped with exhaust gas after-treatment devices (e.g., catalytic converters, particulate traps, catalyzed traps, NOx traps, selective catalysts, etc.) is that the lubricating oils for such engines are used in both the crankcase as well as in high wear areas such as the valve train. Because these oils are used in high wear areas they usually contain extreme pressure (EP) agents which typically contain metal (e.g., zinc) and phosphorus in order to be effective. During the operation of the engine these EP agents decompose and the resulting decomposition products eventually enter the aftertreatment device resulting in damage to and/or impairment of the device. There is need to reduce this impact while still providing sufficient lubrication to the engine. Because of the present invention's absence of high levels of EP agents containing metal and phosphorus the exhaust gas aftertreatment device is protected from such harmful exposure.

Another problem associated with conventional ICE is that the time interval required between oil changes typically is less than the time interval required for other service items such as air filter replacements, coolant changes, brake replacements, and the like. The problem therefore is to improve the lubricant technology for these engines so that the time intervals between oil changes can be extended to coincide with other service intervals. In accordance with the inventive method, the required oil change intervals are extended due to the fact that during operation of the engine, used engine oil is continuously or periodically removed from the engine and replaced with new oil.

Another problem associated with the operation of ICE is that the exhaust gases from such engines contain the undesirable pollutant NOx. It would be advantageous if the NOx level in exhaust gases ICE could be reduced. The present invention may assist in reducing exhaust gas NOx levels because the invention is less harmful to NOx reducing catalysts.

Still another problem associated with the operation of ICE are difficulties in meeting the high demands of government regulations and consumers for low emissions and high fuel economy. One approach to satisfying these demands is the use of a highly dilute pre-mixed fuel for ignition. However, in the case of spark ignition systems, only a limited amount of dilution is tolerable before misfire and unstable operation occur. To overcome this shortcoming of spark ignition systems, "pilot" ignition systems have been used for some time. In these systems a small quantity of liquid fuel is injected into a pre-combustion chamber to allow high energy self-ignition. Direct injection pilot ignition systems using diesel fuel have proven to increase the dilution tolerance of both stoichiometric and lean burn engines. In the case of a non-diesel engine, the use of the diesel-fueled pilot ignition system requires two different fuels for engine operation. Both fuels must be available for re-fueling, and for vehicle engines, both fuels must be carried on-board. However, problems with these systems often includes damage and/or deposit build-up in the combustion chamber, after-treatment device, and/or exhaust recirculation (EGR) system, caused by the fuels used in the injection pilot ignition systems.

There is a need for lubricating compositions and systems that may be integrated with the injection pilot ignition systems of ICE in order to improve engine performance while reducing the negative impact on engine deposits and/or any after-treatment devices and EGR systems being used with the engine.

U.S. Pat. No. 6,588,393 discloses a low-sulfur consumable lubricating oil composition which comprises a synthetic base lubricating oil and from about 1% to 25% by weight of an acylated nitrogen-containing compound having a substituent of at least about 10 aliphatic carbon atoms. The sulfur content of this consumable lubricating oil is about 5 to 250 parts per million.

U.S. Pat. No. 5,955,403 discloses a sulfur free lubricating oil composition which comprises a major portion of a synthetic base lubricating oil and a minor portion of a tri(alkyl phenyl) phosphate or di(alkylphenyl) phosphoric acid antiwear agent, an amine antioxidant, a substituted succinimide rust inhibitor, and a tolyltriazole. The tri(alkylphenyl)phosphate antiwear agent is incorporated in the oil at about 0.1 to 2.0 wt % and the amine antioxidant in amount ranging from about 0.1 to 5 wt %. The succinamide is present from about 0.01 to 0.5 wt %, and the tolyltriazole from about 0.01 to 0.5 wt %.

SUMMARY OF THE INVENTION

The invention provides method of operating an internal combustion engine equipped with a pilot ignition system, a lubricating system and a fuel system, comprising. The method includes: (i) supplying a lubricant to the engine which comprises: (a) an oil of lubricating viscosity; and (b) a succinimide dispersant with a TBN of at least 80 on a diluent-free basis, in an amount sufficient to provide at least 8 TBN to the lubricant. The lubricant also has a zinc content of 0 to about 1000 ppm, a percent sulfated ash value of up to about 0.25, a phosphorus content of about 50 to about 800 ppm, and a sulfur content of up to about 0.4 percent by weight. The method further includes: (ii) obtaining a portion of the lubricant from the lubricating system of the engine and (iii), during the pilot ignition phase of the engine's combustion cycle or when a primary fuel is injected into the engine's combustion chambers from the fuel system, injecting the obtained lubricant portion into one or more of the combustion chambers or pre-combustion chambers of the engine.

The invention further provides the method described above where (i) the lubricant portion is added via a pilot fuel injector; or (ii) the lubricant portion is mixed with an amount of primary fuel and the mixture is added via a pilot fuel injector; or (iii) the lubricant portion is mixed with an amount of primary fuel and the mixture is added via a primary fuel injector; or (iv) combinations thereof. These additions may be by direct injection or by use of a common rail injection system.

The methods also provide for the portion of lubricant consumed during the operation of the engine being replaced by the addition of fresh lubricant to the engine's lubricating system. The engine used in the methods may also be equipped with exhaust gas recirculation and/or an exhaust after treatment device. The methods further provide for the use of heavy duty diesel engines, light duty diesel engines, small displacement engines or stationary diesel engines.

The methods of the invention also provide for the use of a lubricating composition which may optionally include a viscosity improver as well as other performance additives. The oil used in the lubricating compositions of the methods described above and below may include synthetic base oils.

DETAILED DESCRIPTION OF THE INVENTION

Various preferred features and embodiments will be described below by way of non-limiting illustration.

The present invention provides a means of operating an internal combustion engine that utilizes dilution of the engine air to reduce in-cylinder temperatures and reaction rates, thus yielding reduced engine exhaust NOx emissions while also providing improved non-knocking engine efficiency.

The present invention utilizes the benefits of a pilot ignition system (sometimes called a micro-pilot ignition system) without the need of any supplemental hardware, such as a separate pilot system fuel source or the need to carry a pilot system fuel separate from the primary fuel. This is achieved by utilizing the crankcase oil composition used to lubricate the engine as the fuel for the pilot ignition system. However, the use of conventionally formulated lubricating oils, which typically contain ash-forming components and/or ZDP additives, as a fuel for the micro-pilot system can have major detrimental impacts on an engine. These detrimental impacts include increased engine combustion chamber deposits, fuel injector wear, and engine exhaust emissions. The methods of the present invention include the use of uniquely formulated lubricating compositions and allow for the engine to receive the benefits of the pilot ignition system while avoiding these detrimental impacts.

The present invention provides a lubricating composition as described above, which is a suitable pilot ignition system fuel. These compositions have a total sulfur content in one embodiment below about 0.4 percent by weight, in another embodiment below 0.3 percent by weight, in yet another embodiment 0.2 percent by weight or less and in yet another embodiment 0.1 percent by weight or less. Often the major sources of sulfur in the compositions of the invention are derived from conventional diluent oil. Typical ranges for the total sulfur content are 0.01 to 0.1 or 0.4 percent by weight.

Often the composition has a total phosphorus content of less than or equal to 800 ppm and in another embodiments equal to or less than 500 ppm, 300 ppm, 200 ppm, 100 ppm, or 50 ppm of the composition. A typical range for the total phosphorus content is 50 or 100 to 800 ppm.

Often the composition has a total sulfated ash content as determined by ASTM D-874 of below 0.25 or 0.20 percent by weight, in one embodiment equal to or less than 0.1 percent by weight, and in other embodiments equal to or less than 0.07, 0.04, 0.03, or 0.05 percent by weight of the composition. A typical range for the total sulfate ash content is 0.03 or 0.05 to 0.2 or 0.25 percent by weight.

The lubricant composition may have a total zinc content of 0 to about 1000 ppm, about 0.1 percent by weight. In some embodiments the zinc content is no more than 0.07 percent by weight, or 0.01 to 0.05 percent by weight.

Additionally, the lubricant composition is consumable, such that the composition is fed directly to, or premixed with fuel and then fed to, the engine. The composition does not damage either the engine or any after-treatment devices which may be present. Additionally, the consumable lubricant may aid in the cleaning of the combustion chamber and/or piston areas of the engine.

The Internal Combustion Engine

The internal combustion engine may be a spark-ignited or a compression-ignited engine. These engines include automobile and truck engines, two-cycle engines, aviation piston engines, and marine and railroad diesel engines. Included are on- and off-highway engines. The compression-ignited engines include those for both mobile and stationary power plants. The compression-ignited engines include those used in urban buses, as well as all classes of trucks. The compression-ignited engines may be of the two-stroke per cycle or four-stroke per cycle type. The compression-ignited engines include heavy duty diesel engines for both mobile (including marine) and stationary power plants. These include diesel engines of the two-stroke per cycle and four-stroke per cycle types, on and off-highway engines, including new engines as well as in-use engines, such as those used in automobiles, trucks, buses, and locomotives. Also included are heavy duty diesel engine, light duty diesel engines, small displacement engines such as motorcycle engines, and stationary diesel engines.

The internal combustion engines of the present invention are equipped with pilot ignition systems or a similar device. In an internal combustion engine, the ignition system ignites the fuel consumed by the engine. Most engines use an electrical ignition system or a compression heating ignition system. Pilot ignition systems are auto-ignition systems, as compared to spark ignition systems. A pilot fuel is introduced into the engine cylinder under pressure, and as the piston compresses the gases in the cylinder, the pilot fuel auto-ignites. Pilot ignition systems may, in theory be used with any type of internal combustion engine, including but not limited to diesel and gasoline engines, engines using alternative fuels such as hydrogen or natural gas, or electric engines. Pilot ignition systems for internal combustion engines are also sometimes referred to as micro-pilot ignition systems, because of the low flow rates.

For purposes of the invention, it is assumed that the engine has a separate lubricating oil system with a reservoir of lubricating oil. This lubricating oil system is "separate" in the sense that the oil is not part of the fuel mix consumed by the engine, such as in the case of a two-stroke engine.

The methods of the present invention include a means for supplying a portion of the uniquely formulated lubricating composition into one or more of the combustion chambers and/or pre-combustion chambers of the engine during the pilot ignition phase of the engine's combustion cycle. Unless otherwise indicated below, the use of the term "combustion chamber" herein also includes any pre-combustion chamber, such that the primary fuel and/or pilot fuel may each be supplied to either one or both.

In some embodiments the lubricating composition is supplied to the combustion chamber by a fuel injector. The fuel injector may be the same fuel injector used to supply the primary fuel to the combustion chamber, or it may be a separate independent fuel injector, where such an independent, dedicated fuel injector is present in each combustion chamber of the engine. The lubricating composition may also be mixed with the primary fuel before it is injected into the combustion chamber. In other embodiments it may be added separately from the primary fuel and is not pre-mixed with the fuel. In still other embodiments, the lubricating composition and primary fuel may be mixed in the injector itself. Combinations of these various embodiments are also included in the invention.

In some embodiments, the present invention involves the injection of lubricating oil as the pilot fuel separate from the injection of the primary fuel. In these embodiments the lubricating oil is maintained as a fluid separate from the primary fuel until they reach the combustion chamber.

The lubricating composition used as the pilot fuel may be drawn from any point in the lubricating system. In some embodiments the oil is drawn from a reservoir, such as the oil pan or a new oil reservoir. The ratio (by weight) of lubricating oil composition to primary fuel may be from about 0.1:100 to about 10:100, and in some embodiments, is from about 0.1:100 to about 2:100. The oil level in the engine lubricating system may be maintained in the engine by refilling the oil reservoir. In some embodiments, the oil is drawn from the oil pan and then replaced by fresh engine oil. In such embodiments the service drain interval of the engine oil may be extended, allowing for longer time periods between oil changes and/or improved performance of the lubricating oil composition.

In some embodiments, the lubricating oil composition being used as the pilot ignition system fuel is injected directly into the combustion chamber by an injector, such as conventional injectors used for diesel fuel in diesel engines. The injection may be into a pre-combustion chamber or elsewhere into chamber.

A common rail direct (CRD) injection ignition system may also be used in conjunction with the lubricating oil compositions of the present invention. In a CRD system, a common rail or pipe acts as a shared reservoir of fuel. The fuel is stored in the common rail at a high pressure, which eliminates the need for a build-up of pressure individually at each injector. Connectors from the common rail deliver fuel to each injector. At the end of the injector, a valve regulates the injection timing and the amount of fuel injected, based on inputs from a microprocessor or an electronic control unit (ECU). As in conventional injection systems, once the fuel is injected into the cylinder, compression heats the air to temperatures above the ignition point of the fuel. Most conventional CRD engines also employ a "pilot injection" or "pilot burn". Shortly before the primary fuel is injected into the cylinders, a small amount of diesel is injected. The pilot injection and ignition starts the combustion process even before the main load is injected.

The lubricating oil compositions suitable for use in the present invention reduce engine-out emissions by increasing the dilution limit of the air-fuel mixture, regardless whether the dilution is by EGR or lean operation. Lubricating oil injected into the combustion chamber ignites readily even when the engine is equipped with an exhaust gas recirculation (EGR) system. The use of lubricating oil as a pilot ignition system fuel increases engine efficiency, for example, by allowing ignition timing that approaches MBT (maximum brake torque) ignition timing. The lubricating oil may also be mixed with fuel and this mixture may be used as the pilot ignition system fuel. Fuels suitable for use with the present invention are described below.

After-Treatment Device

The engine of the present invention may be equipped with an after-treatment device. The exhaust gas after-treatment device may be referred to as a catalytic converter and may be of any conventional design. The exhaust after-treatment device may comprise flow-through passages of ceramic or metal coated with a washcoat comprised of zeolite, $Al_2O_3$, $SiO_2$, $TiO_2$, $CeO_2$, $ZrO_2$, $V_2O_5$, $La_2O_3$, or mixtures of two or more thereof, the washcoat supporting a catalyst selected from the group consisting of Pt, Pd, Rh, Ir, Ru, V, Cr, Mn, Fe, Co, Ni, Cu, Zn, Ag, Ce, Ga, or a mixture of two or more thereof. In one embodiment the after-treatment device is a particulate filter containing oxidation catalyst. The particulate filters are essentially fine porous filters used to trap small particulate matter from the combustion chamber, while the oxidation catalysts are precious metals, such as platinum or palladium, that act as catalytic material on the particulate filter in reducing toxic emissions.

The after-treatment device may also be a particulate trap, a catalyzed trap, a NOx trap, a selective catalytic reduction device, or some combination thereof. In some embodiments the methods of the invention improve the performance of the engine while also protecting and/or improving the performance of such after-treatment devices.

Exhaust Gas Recirculation

The engine of the present invention may be equipped with exhaust gas recirculation. Exhaust gas recirculation (EGR) is a technique that directs the exhaust back into the air intake. Because these gases have already been used by the engine, they have a lower oxygen level. By reducing the oxygen level in the air intake there is less oxygen available to allow nitrogen oxides to form. The exhaust gas in the air intake also lowers the peak in cylinder gas temperature and helps to lower the level of NOx (high temperatures are needed for NOx formation).

Oil of Lubricating Viscosity

The low-sulfur, low-phosphorus, low-ash lubricating consumable oil composition comprises one or more base oils which are generally present in a major amount (i.e., an amount greater than about 50 percent by weight). Generally, the base oil is present in an amount greater than about 60 percent, or greater than about 70 percent, or greater than about 80 percent by weight of the lubricating oil composition. The base oil sulfur content is typically less than 0.4 or 0.2 percent by weight.

Oils of lubricating viscosity have also been characterized by the API as Groups I, II, III, IV, and V, on the basis of sulfur content, amount of saturates, and viscosity index (for Groups I-III), with all polyalphaolefins referred to as Group IV and all others not in Groups I-IV as Group V. Group III oils are often blended with synthetic oils. The present invention can be used in any of these API Groups or blends thereof.

As an additional component, which is often considered along with the oil of lubricating viscosity as a part of the base stock, is a viscosity modifier. Viscosity modifiers are commonly used in natural lubricating formulations, and are sometimes unnecessary in high grade synthetic formulations. Viscosity modifiers are generally polymeric materials which are well known to those skilled in the art of lubricant formulation, and include polyisobutenes, polymethacrylate acid esters, polyacrylate acid esters, diene polymers, polyalkyl styrenes, alkenyl arene conjugated diene copolymers, polyolefins and multifunctional viscosity improvers, including dispersant viscosity modifiers (which impart both dispersancy and viscosity improvement).

The formulations of the present invention can be used in lubricating oils without particular restriction as to viscosity grade. For instance, they can be used in oils, optionally including a viscosity modifier, having an SAE multigrade viscosity rating of 0W-10, 0W-20, 0W-30, 5W-20, or 5W-30, or in monograde oils having SAE viscosity ratings of 20 or 30.

Multigrade lubricants may include a viscosity improver which is formulated with the oil of lubricating viscosity to provide the above lubricant grades. Useful viscosity improvers include but are not limited to polyolefins, such as ethylene-propylene copolymers, or polybutylene rubbers, including hydrogenated rubbers, such as styrene-butadiene or styrene-isoprene rubbers; or polyacrylates, including polymethacrylates. In one embodiment, the viscosity improver is a polyolefin or polymethacrylate. Viscosity improvers available commercially include Acryloid™ viscosity improvers available from Rohm & Haas; Shellvis™ rubbers available from Shell Chemical; Trilene™ polymers, such as Trilene™ CP-40, available commercially from Uniroyal Chemical Co., and Lubrizol 3100 series and 8400 series polymers, such as Lubrizol® 3174 available from The Lubrizol Corporation. Additional additives may also be present in the lubricating compositions of the present invention and these additives are described in greater detail below.

When the lubricating compositions comprise a synthetic oil base stock, the oil can advantageously be a blend of a polyalphaolefin and a synthetic ester. The polyalphaolefin and the synthetic ester can be present, for example, in weight ratios of 95:5 to 80:20 or about 90:10. These oils can be selected from materials having suitable viscosity to provide to the composition a viscosity grade of 0W-10, with or without the presence of a viscosity modifier. Such a formulation may be desirable for very high performance or racing applications.

In some embodiments, the low-sulfur, low-phosphorus, low-ash consumable lubricating oil compositions of the present invention may have a viscosity of up to about 26.1 or 16.3 mm$^2$/s (cSt) at 100° C., and in one embodiment 5 to 16.3 mm$^2$/s (cSt) at 100° C., and in one embodiment 6 to 13 mm$^2$/s (cSt) at 100° C. In one embodiment, the lubricating compositions have an SAE Viscosity Grade of 0W, 0W-20, 0W-30, 0W-40, 0W-50, 0W-60, 5W, 5W-20, 5W-30, 5W-40, 5W-50, 5W-60, 10W, 10W-20, 10W-30, 10W-40 or 10W-50.

In some embodiments, the oil of lubricating viscosity and/or the lubricating composition containing the oil, may have a so-called multigrade rating such as SAE 75W-80, 75W-90, 80W-90, or 85W-90.

The lubricating composition may have a high-temperature/high-shear viscosity at 150° C. as measured by the procedure in ASTM D4683 of up to 5 or 4 mm$^2$/s (cSt), and in one embodiment up to 3.7 mm$^2$/s (cSt), and in one embodiment 2 to 4 or 5 mm$^2$/s (cSt), and in one embodiment 2.2 to 3.7 mm$^2$/s (cSt), and in one embodiment 2.7 to 3.5 mm$^2$/s (cSt).

The base oil used in the low-sulfur low-phosphorus, low-ash lubricant composition may be a natural oil, synthetic oil or mixture thereof, provided the sulfur content of such oil does not exceed the above-indicated sulfur concentration limit for the inventive low-sulfur, low-phosphorus, low-ash lubricating oil composition. The derived oils that are useful include animal oils and vegetable oils (e.g., castor oil, lard oil) as well as mineral lubricating oils such as liquid petroleum oils and solvent treated or acid-treated mineral lubricating oils of the paraffinic, naphthenic or mixed paraffinic-naphthenic types. Oils derived from coal or shale are also useful. Synthetic lubricating oils include hydrocarbon oils such as polymerized and interpolymerized olefins; poly(1-hexenes), poly-(1-octenes), poly(1-decenes), etc. and mixtures thereof; alkylbenzenes; polyphenyls; alkylated diphenyl ethers and the derivatives, analogs and homologs thereof and the like.

Alkylene oxide polymers and interpolymers and derivatives thereof where the terminal hydroxyl groups have been modified by such processes as esterification or etherification constitute another class of known synthetic lubricating oils that can be used. These are exemplified by the oils prepared through polymerization of ethylene oxide or propylene oxide, the alkyl and aryl ethers of these polyoxyalkylene polymers or mono- and polycarboxylic esters thereof, for example, the acetic acid esters, mixed C3-8 fatty acid esters, or the carboxylic acid diester of tetraethylene glycol.

Another suitable class of synthetic lubricating oils that can be used comprises the esters of dicarboxylic acids with a variety of alcohols. Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, and the complex ester formed by reacting one mole of sebacic acid with two moles of tetraethylene glycol and two moles of 2-ethylhexanoic acid. Esters useful as synthetic oils also include those made from C5 to C12 monocarboxylic acids and polyols and polyol ethers such as neopentyl glycol, trimethylol propane, pentaerythritol, dipentaerythritol, or tripentaerythritol.

The oil can be a poly-alpha-olefin (PAO). Typically, the PAOs are derived from monomers having from 4 to 30, or from 4 to 20, or from 6 to 16 carbon atoms. Examples of useful PAOs include those derived from octene, decene, or mixtures thereof. Mixtures of mineral oil with one or more of the foregoing PAOs may be used.

Unrefined, refined and rerefined oils, either natural or synthetic (as well as mixtures of two or more of any of these) of the type disclosed hereinabove can be used in the lubricants of the present invention. Unrefined oils are those obtained directly from a natural or synthetic source without further purification treatment. For example, a shale oil obtained directly from retorting operations, a petroleum oil obtained directly from primary distillation or ester oil obtained directly from an esterification process and used without further treatment would be an unrefined oil. Refined oils are similar to the unrefined oils except they have been further treated in one or more purification steps to improve one or more properties. Many such purification techniques are known to those skilled in the art such as solvent extraction, secondary distillation, acid or base extraction, filtration, percolation, etc. Rerefined oils are obtained by processes similar to those used to obtain refined oils applied to refined oils which have been already used in service. Such rerefined oils are also known as reclaimed or reprocessed oils and often are additionally processed by techniques directed to removal of spent additives and oil breakdown products.

Additionally, oils prepared by hydroisomerization of waxes, (e.g., slack wax or Fischer-Tropsch synthetic wax) are known and can be used.

In some embodiments, the oil of lubricating viscosity of the present invention has a maximum sulfur content of 0.03 percent by weight, or 0.02, or 0.01 percent by weight.

The Succinimide Dispersant.

The dispersants of the invention are often derived from N-substituted long chain alkenyl succinimides. The invention employs a succinimide dispersant with a high Total Base Number. Generally dispersants with a high TBN number have a nitrogen to carbonyl ratio of at least about 1.4, in one embodiment at least about 1.6, in one embodiment 1.8 or greater, in another embodiment 2.0 or greater. The nitrogen to carbonyl ratio is to be calculated on a molar basis, that is, the ratio of moles of nitrogen functionality (e.g., amine nitrogens) to the moles of carbonyl functionality (e.g., —C(O)O—). In one embodiment, a TBN value is 60, in another embodiment 80, in another embodiment 90 to 100 in yet another embodiment 100 to 110 or 120.

Succinimide dispersants are well known in the field of lubricants and include primarily what are sometimes referred to as "ashless" dispersants because (prior to mixing in a lubricating composition) they do not contain ashforming metals and they do not normally contribute any ash forming metals when added to a lubricant. Succinimide dispersants are the reaction product of a hydrocarbyl substituted succinic acylating agent with an organic hydroxy compound or, preferably, an amine containing at least one hydrogen attached to a nitrogen atom, or a mixture of said hydroxy compound and amine. The term "succinic acylating agent" refers to a hydrocarbon-substituted succinic acid or succinic acid-producing compound (which term also encompasses the acid itself). Such materials typically include hydrocarbyl-substituted succinic acids, anhydrides, esters (including half esters) and halides.

Succinic based dispersants have a wide variety of chemical structures including typically structures such as:

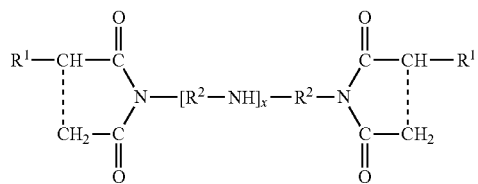

In the above structure, each $R^1$ is independently a hydrocarbyl group, which may be bound to multiple succinimide groups, typically a polyolefin-derived group derived from a polyolefin having an $\overline{M}_n$ of 500 or 700 to 10,000. Typically the hydrocarbyl group is an alkyl group, frequently a polyisobutylene (PIB) group derived from PIB with a molecular weight of 500 or 700 to 5000, in some embodiments 1500 or 2000 to 5000, and in still other embodiments 300 or 700 to 3000 or 2000 or 1600. Alternatively expressed, the $R^1$ groups can contain 40 to 500 carbon atoms and preferably at least 50, e.g., 50 to 300 carbon atoms, preferably aliphatic carbon atoms. The $R^2$ are alkylene groups, commonly ethylene ($C_2H_4$) groups. Such molecules are commonly derived from reaction of an alkenyl acylating agent with a polyamine, and a wide variety of linkages between the two moieties is possible beside the simple imide structure shown above, including a variety of amides and quaternary ammonium salts. Succinimide dispersants are more fully described in U.S. Pat. Nos. 4,234,435, 3,172,892, and 6,165,235.

The polyalkenes from which the substituent groups are derived are typically homopolymers and interpolymers of polymerizable olefin monomers of 2 to 16 carbon atoms; usually 2 to 6 carbon atoms.

The olefin monomers from which the polyalkenes are derived are polymerizable olefin monomers characterized by the presence of one or more ethylenically unsaturated groups (i.e., >C=C<); that is, they are mono-olefinic monomers such as ethylene, propylene, 1-butene, isobutene, and 1-octene or polyolefinic monomers (usually diolefinic monomers) such as 1,3-butadiene, and isoprene. These olefin monomers are usually polymerizable terminal olefins; that is, olefins characterized by the presence in their structure of the group >C=CH_2. Relatively small amounts of non-hydrocarbon substituents can be included in the polyolefin, provided that such substituents do not substantially interfere with formation of the substituted succinic acid acylating agents.

Each $R^1$ group may contain one or more reactive groups, e.g., succinic groups, thus the precursor to the dispersion may be represented (prior to reaction with the amine) by structures such as:

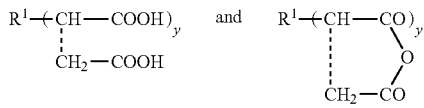

in which y represents the number of such succinic groups attached to the $R^1$ group and where $R^1$ is defined above. In one type of dispersant, y=1. In another type of dispersant, y is greater than 1, in one embodiment greater than 1.3 or greater than 1.4; and in another embodiment y is equal to or greater than 1.5. in one embodiment y is 1.4 to 3.5, such as 1.5 to 3.5 or 1.5 to 2.5. Fractional values of y, of course, can arise because different specific $R^1$ chains may be reacted with different numbers of succinic groups.

The amines which are reacted with the succinic acylating agents to form the carboxylic dispersant composition can be monoamines or polyamines. In either case they will be characterized by the formula $R^4R^5NH$ wherein $R^4$ and $R^5$ are each independently hydrogen, hydrocarbon, amino-substituted hydrocarbon, hydroxy-substituted hydrocarbon, alkoxy-substituted hydrocarbon, amino, carbamyl, thiocarbamyl, guanyl, or acylimidoyl groups provided that no more than one of $R^4$ and $R^5$ is hydrogen. In all cases, therefore, they will be characterized by the presence within their structure of at least one H—N<group. Therefore, they have at least one primary (i.e., $H_2N$—) or secondary amino (i.e., H—N<) group. Examples of monoamines include ethylamine, diethylamine, n-butylamine, di-n-butylamine, allylamine, isobutylamine, cocoamine, stearylamine, laurylamine, methyllaurylamine, oleylamine, N-methyl-octylamine, dodecylamine, and octadecylamine.

The polyamines from which the dispersant is derived include principally alkylene amines conforming, for the most part, to the formula:

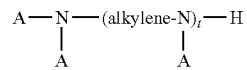

wherein t is an integer typically less than 10, A is hydrogen or a hydrocarbyl group typically having up to 30 carbon atoms, and the alkylene group is typically an alkylene group having less than 8 carbon atoms. The alkylene amines include principally, ethylene amines, hexylene amines, heptylene amines, octylene amines, other polymethylene amines. They are exemplified specifically by: ethylene diamine, diethylene triamine, triethylene tetramine, propylene diamine, decamethylene diamine, octamethylene diamine, di(heptamethylene) triamine, tripropylene tetramine, tetraethylene pentamine, trimethylene diamine, pentaethylene hexamine, di(-trimethylene) triamine. Higher homologues such as are obtained by condensing two or more of the above-illustrated alkylene amines likewise are useful. Tetraethylene pentamine is particularly useful.

The ethylene amines, also referred to as polyethylene polyamines, are especially useful. They are described in some detail under the heading "Ethylene Amines" in Encyclopedia of Chemical Technology, Kirk and Othmer, Vol. 5, pp. 898-905, Interscience Publishers, New York (1950).

Hydroxyalkyl-substituted alkylene amines, i.e., alkylene amines having one or more hydroxyalkyl substituents on the nitrogen atoms, likewise are useful. Examples of such amines include N-(2-hydroxyethyl)ethylene diamine, N,N'-bis(2-hydroxyethyl)-ethylene diamine, 1-(2-hydroxyethyl)-piperazine, monohydroxypropyl)-piperazine, di-hydroxypropy-substituted tetra-ethylene pentamine, N-(3-hydroxypropyl)-tetra-methylene diamine, and 2-heptadecyl-1-(2-hydroxyethyl)-imidazo line.

Higher homologues, such as are obtained by condensation of the above-illustrated alkylene amines or hydroxy alkyl-substituted alkylene amines through amino radicals or through hydroxy radicals, are likewise useful. Condensed polyamines are formed by a condensation reaction between at least one hydroxy compound with at least one polyamine reactant containing at least one primary or secondary amino group and are described in U.S. Pat. No. 5,230,714 (Steckel).

The succinimide dispersant is referred to as such since it normally contains nitrogen largely in the form of imide functionality, although it may be in the form of amine salts, amides, and imidazolines including mixtures of one or more of these with imides. To prepare the succinimide dispersant, one or more of the succinic acid-producing compounds and one or more of the amines are heated, typically with removal of water, optionally in the presence of a normally liquid, substantially inert organic liquid solvent/diluent at an elevated temperature, generally in the range of 80° C. up to the decomposition point of the mixture or the product; typically 100° C. to 300° C.

The succinic acylating agent and the amine (or organic hydroxy compound, or mixture thereof) are typically reacted in amounts sufficient to provide at least one-half equivalent, per equivalent of acid-producing compound, of the amine (or hydroxy compound, as the case may be). Generally, the maximum amount of amine present will be about 1 mole of amine per equivalent of succinic acylating agent. For the purposes of this invention, an equivalent of the amine is that amount of the amine corresponding to the total weight of amine divided by the total number of nitrogen atoms present. The number of equivalents of succinic acid-producing compound will vary with the number of succinic groups present therein, and generally, there are two equivalents of acylating reagent for each succinic group in the acylating reagents. Additional details and examples of the procedures for preparing the succinimide dispersants of the present invention are included in, for example, U.S. Pat. Nos. 3,172,892; 3,219,666; 3,272,746; 4,234,435; 6,440,905 and 6,165,235.

The dispersants may be borated materials. Borated dispersants are well-known materials and can be prepared by treatment with a borating agent such as boric acid. Typical conditions include heating the dispersant with boric acid at 100 to 150° C. The dispersants may also be treated by reaction with maleic anhydride as described in WO00/26327.

In one embodiment, the amount of the succinimide dispersant in a completely formulated consumable lubricant will typically be 2.0 to 20 percent by weight; in another embodiment, 4 to 16 percent by weight or 6 to 14 percent by weight, or 7 to 10 percent by weight. Its concentration in a concentrate will be correspondingly increased to, e.g., 15 to 80 weight percent Fuel Fuels suitable for use in the present invention are not overly limited. Generally, suitable fuels are normally liquid at ambient conditions e.g., room temperature (20 to 30° C.). The liquid fuel can be a hydrocarbon fuel, a non-hydrocarbon fuel, or a mixture thereof.

The hydrocarbon fuel can be a petroleum distillate, including a gasoline as defined by ASTM specification D4814, or a diesel fuel, as defined by ASTM specification D975. In one embodiment the liquid fuel is a gasoline, and in another embodiment the liquid fuel is a non-leaded gasoline. In another embodiment the liquid fuel is a diesel fuel. The hydrocarbon fuel can be a hydrocarbon prepared by a gas to liquid process to include for example hydro-carbons prepared by a process such as the Fischer-Tropsch process. In some embodiments, the fuel used in the present invention is a diesel fuel, a biodiesel fuel, or combinations thereof.

The non-hydrocarbon fuel can be an oxygen containing composition, often referred to as an oxygenate, which includes an alcohol, an ether, a ketone, an ester of a carboxylic acid, a nitroalkane, or a mixture thereof. The non-hydrocarbon fuel can include for example methanol, ethanol, methyl t-butyl ether, methyl ethyl ketone, transesterified oils and/or fats from plants and animals such as rapeseed methyl ester and soybean methyl ester, and nitro-methane.

Mixtures of hydrocarbon and non-hydrocarbon fuels can include, for example, gasoline and methanol and/or ethanol, diesel fuel and ethanol, and diesel fuel and a transesterified plant oil such as rapeseed methyl ester and other bio-derived fuels. In one embodiment the liquid fuel is an emulsion of water in a hydrocarbon fuel, a non-hydrocarbon fuel, or a mixture thereof. In several embodiments of this invention the liquid fuel can have a sulfur content on a weight basis that is 5000 ppm or less, 1000 ppm or less, 300 ppm or less, 200 ppm or less, 30 ppm or less, or 10 ppm or less.

The fuel may be a petroleum based fuel, including gas-to-liquid fuels, or a coal-to-liquid fuels. CNG and LNG fuels may also be used with the methods of the present invention. Such fuels sometimes require specialized engines and/or equipment, and the use of such engines and equipment with such fuels are contemplated within the methods of the invention.

The fuel may be a diesel fuel. Diesel fuels include hydrocarbonaceous petroleum distillate fuels such as those defined by ASTM Specification D396. Normally liquid diesel fuels containing materials such as alcohols, ethers, and organo-nitro compounds (e.g., methanol, ethanol, diethyl ether, methyl ethyl ether, nitromethane) are also within the scope of this invention as are liquid fuels derived from vegetable or mineral sources such as corn, alfalfa, shale and coal. Examples of such mixtures include diesel fuel and ether.

In some embodiments the diesel fuel that is a low-sulfur diesel fuel. Such diesel fuels typically have a 90% point distillation temperature in the range of 300° C. to 390° C., and in one embodiment 330° C. to 350° C. The viscosity for these fuels typically ranges from about 1.3 to 24 centistokes at 40° C. The diesel fuels can be classified as any of Grade Nos. 1-D, 2-D or 4-D as specified in ASTM D975. These diesel fuels may contain alcohols and esters. In particular the diesel fuel may be a diesel fuel termed ultra low sulfur diesel (ULSD), including fuels which have a maximum 50, 25 or even 15 parts per million (ppm) sulfur content and a 95% distillation temperature of less than 345° C. as determined by the test method specified in ASTM D2622-87. A typical range for the sulfur content of the fuel is 0 to 50 ppm or 1 to 30 ppm or 2 to 15 ppm.

The fuel compositions may contain one or more fuel additives known in the art for enhancing the performance of the fuel. These include deposit preventers or modifiers, dyes, cetane improvers, antioxidants such as 2,6-di-tertiary-butyl-4-methyl-phenol, corrosion inhibitors such as alkylated succinic acids and anhydrides, bacteriostatic agents, gum inhibitors, metal deactivators, demulsifiers, upper cylinder lubricants, anti-icing agents, and ashless dispersants.

The fuel additives may be added directly to the fuel, or they may be diluted with a normally liquid organic diluent such as naphtha, benzene, toluene, or xylene to form an additive concentrate prior to addition to the fuel. These concentrates typically contain 10% to 90% by weight diluent Miscellaneous The lubricating compositions useful in the methods of the invention may further comprise an antiwear agent that is a derivative of hydroxycarboxylic acid. Such derivatives include imides, di-esters, di-amides, di-imides (applicable for tetra-acids and higher), ester-amides, ester-imides (applicable for tri-acids and higher, such as citric acid), or imide-amides (applicable for tri-acids and higher, such as citric acid). In one embodiment the antiwear agent includes imides, di-esters, di-amides, or ester-amides. Examples of a suitable a hydroxycarboxylic acid include citric acid, tartaric acid, malic acid (or hydroxy-succinic acid), mandelic acid, lactic acid, glycolic acid, hydroxy-propionic acid, hydroxyglutaric acid, or mixtures thereof. In one embodiment the antiwear agent may be derived from tartaric acid, citric acid, hydroxy-succinic acid, dihydroxy mono-acids, mono-hydroxy diacids, or mixtures thereof. In one embodiment the antiwear agent includes a compound derived from tartaric acid. The derivative of a hydroxycarboxylic acid may be present at 0.005 wt % to 10 wt %, or 0.025 to 5 wt %, or 0.25 to 2.5 wt % of the lubricating composition. These additives may provide antiwear performance but may also function as rust and corrosion inhibitors, friction modifiers, and/or demulsifiers.

US Patent Publication 2005/198894 discloses suitable hydroxycarboxylic acid compounds, and methods of preparing the same. Canadian Patent 1183125; US Patent Publication numbers 2006/0183647 and 2006/0079413; U.S. Patent Applications 60/867,402 (PCT/US07/085,547); and British Patent 2105743A, all disclose examples of suitable tartaric acid derivatives. A detailed description of methods for preparing suitable tartrimides (by reacting tartaric acid with a primary amine) is disclosed in U.S. Pat. No. 4,237,022.

The lubricating compositions useful in the methods of the invention may further comprise an dispersant viscosity modifier (DVM) that comprises an amine-functionalised additive, wherein the amine-functionalised additive is derived from an amine having at least 3 aromatic groups, at least one —$NH_2$ functional group, and at least 2 secondary or tertiary amino groups. The amine having at least 3 aromatic groups may be bis[p-(p-aminoanilino)phenyl]-methane, 2-(7-amino-acridin-3-ylmethyl)-N-4-{4-[4-(4-amino-phenylamino)-benzyl]-phenyl}-benzene-1,4-diamine, or mixtures thereof. The amine-functionalised additive may be the reaction product of such an amine with a carboxylic functionalised polymer, where the polymer is a polyisobutylene-succinic anhydride polymer, a maleic anhydride-styrene copolymer, an ester of a maleic anhydride-styrene copolymer, an alpha olefin-maleic anhydride copolymer, a maleic anhydride graft copolymer, or mixtures thereof. The amines described above may also be reacted with an aldehyde to form acridine derivatives and the amine-functionalised additives described above may also be reacted with an aldehyde to form Mannich reaction products. These additives may be added to a lubricant in a range of 0.01 wt % to 20 wt %, or 0.05 wt % to 10 wt %, or 0.08 wt % to 5 wt %, or 0.1 wt % to 3 wt % of the lubricating composition. These additives are described in greater detail in U.S. patent application Ser No. 61/118,012.

Other DVMs useful in the methods and compositions of the invention include the reaction product of: (a) a polymer comprising carboxylic acid functionality or a reactive equivalent thereof, said polymer having a number average molecular weight of greater than 5,000; and (b) an amine component comprising at least one aromatic amine containing at least one amino group capable of condensing with said carboxylic acid functionality to provide a pendant group and at least one additional group comprising at least one nitrogen, oxygen, or sulfur atom, wherein said aromatic amine is selected from the group consisting of (i) a nitro-substituted aniline, (ii) amines comprising two aromatic moieties linked by a —C(O)NR— group, a —C(O)O— group, an —O— group, an —N═N— group, or an —$SO_2$— group where R is hydrogen or hydrocarbyl, one of said aromatic moieties bearing said condensable amino group, (iii) an aminoquinoline, (iv) an aminobenzimidazole, (v) an N,N-dialkylphenylenediamine, and (vi) a ring-substituted benzylamine.

The polymer may be an ethylene-alpha olefin copolymer containing grafted carboxylic functionality, an isobutylene/conjugated diene polymer containing grafted carboxylic functionality, a partially esterified maleic anhydride-styrene copolymer, a substantially hydrogenated copolymer of styrene and a conjugated diene, a polyacrylate or a polymethacrylate, or combinations thereof. The amine may be an aromatic or alpihatic amine and may comprises 4-(4-nitro-phenylazo)aniline, N,N-dimethylaminopropylamine, aminopropylmorpholine, N,N-dimethylaminopropylamine. These additives may be added to a lubricant in a range of 0.01 wt % to 20 wt %, or 0.05 wt % to 10 wt %, or 0.08 wt % to 5 wt %, or 0.1 wt % to 3 wt %, or 0.5 wt % to 1.5 wt % of the lubricating composition. These additives are described in greater detail in US Patent Publication 2006/0025316 (PTC/US05/015,130).

Still other DVMs useful in the methods and compositions of the invention include additives obtained from the reaction of: (1) an anthranilic anhydride; (2) a polymer containing (i) an anhydride group, (ii) a carboxylic acid group, or (iii) an acyl group; and (3) at least one member of the group selected from (i) an amine, wherein the amine contains a primary or secondary amino-group, (ii) an alcohol, (iii) an aminoalcohol, and (iv) a thiol. The anthranilic anhydride may be isatoic anhydride. The amine may be xylylenediamine, aniline, 4-aminodiphenylamine, benzylamine, phenethylamine, 3,4-dimethoxyphenethylamine, 1,4-dimethylphenylenediamine, ethylenediamine, 1,2-diaminopropane, N-methylethylenediamine, N-tallow($C_{16}$-$C_{18}$)-1,3-propylenediamine, N-oleyl-1,3-propylenediamine, and polyethylenepolyamines. The polymer may be derived from polymethacrylates, polyacrylates, polyisobutylenes, hydrogenated copolymers of styrene-butadiene, ethylene-propylene copolymers, isobutylene-isoprene copolymers, polyisobutenes, hydrogenated styrene-isoprene polymers, hydrogenated isoprene polymers, hydrogenated alkenyl arene conjugated diene copolymers, polyolefins, esters of maleic anhydride-styrene copolymers thereof. These additives may be present in a range of 0.01 wt % to 20 wt %, or 0.05 wt % to 10 wt %, or 0.08 wt % to 5 wt %, or 0.1 wt % to 3 wt % of the lubricating composition. These additives are described in greater detail in U.S. patent application Ser. No. 60/987,499 (PTC/US08/082,944).

Antioxidants may be used which including hindered phenolic antioxidants such as 2,6,-di-t-butylphenol, and hindered phenolic esters. Such additives are described in more detail in U.S. Pat. No. 6,559,105. Additional antioxidants can include secondary aromatic amine antioxidants, oil-soluble copper compounds, phosphorus-containing antioxidants, molybdenum compounds such as the Mo dithiocarbamates, organic sulfides, disulfides, and polysulfides. An extensive list of antioxidants is found in U.S. Pat. No. 6,251,840.

The EP/antiwear agent used in connection with the present invention is typically in the form of a phosphorus ester of the formula $(R^1X)(R^2X)P(X)_nX_mR^3$ or an amine salt thereof, where each X is independently an oxygen atom or a sulfur atom, n is 0 or 1, m is 0 or 1, m+n is 1 or 2, and $R^1$, $R^2$, and $R^3$ are hydrogen or hydrocarbyl groups. At least one of $R^1$, $R^2$, and $R^3$ is a hydrocarbyl group, and in one embodiment at least one is hydrogen. This component thus includes phosphite esters, phosphate esters, and thiophosphite and thiophosphate esters. The esters can be mono-, di- or tri-hydrocarbyl esters. It is noted that certain of these materials can exist in tautomeric forms, and that all such tautomers are intended to be encompassed by the above formula. For example certain phosphite esters can be written in at least two ways, $(RO)_2$—PH(=O) and $(RO)_2$—P—OH, differing merely by the placement of the hydrogen.

The total number of carbon atoms in $R^1$, $R^2$ and $R^3$ in each of the above formula (for the phosphorus compound) should be sufficient to render the compound soluble in the medium. Generally, the total number of carbon atoms in $R^1$, $R^2$ and $R^3$ is at least 8, and in one embodiment at least 12, and in one embodiment at least 16. In one embodiment, $R^1$, $R^2$ and $R^3$ in the above formula are independently hydrocarbyl groups of 1 to 100 carbon atoms, or 1 to 50 carbon atoms, or 1 to 30 carbon atoms. Each $R^1$, $R^2$ and $R^3$ can be the same as the other, but they may also each be different. Examples of useful $R^1$, $R^2$ and $R^3$ groups include hydrogen, n-butyl, isobutyl, amyl, isooctyl, decyl, dodecyl, oleyl, $C_{18}$ alkyl, eicosyl, 2-pentenyl, dodecenyl, phenyl, naphthyl, alkylphenyl, alkylnaphthyl, phenylalkyl, naphthylalkyl, alkylphenylalkyl, and alkylnaphthylalkyl.

In one embodiment at least two of the X atoms in the above structure are oxygen, so that the structure will be $(R^1O)(R^2O)P(X)_nX_mR^3$. In one embodiment $R^1$, $R^2$ and $R^3$ are all aryl and all X's are O.

The $R^1$ and $R^2$ groups can comprise a mixture of hydrocarbyl groups derived from commercial alcohols. Examples of some preferred monohydric alcohols and alcohol mixtures include the commercially available Alfol™ alcohols marketed by Continental Oil Corporation. Another commercially available alcohol mixture is Adol™ 60 marketed by Ashland Chemical.

In one embodiment, the phosphorus-containing agent is a hydrocarbyl phosphate. In another embodiment, the hydrocarbyl phosphate can be a hydrocarbyl thiophosphate. In yet another embodiment, the phosphorus compound can be a phosphorus-containing amide, such as the reaction product of dithiophosphoric acid and acrylamide or methylene bis-acrylamide.

Examples of phosphorus-containing materials are phosphites and phosphates such as dibutyl phosphite, diphenylphosphite, triphenylphosphite, tricresylphosphate and triphenylthiophosphate.

The amount of phosphorus ester or amine salt present is typically enough to deliver up to 0.05 percent by weight of phosphorus to the composition, in one embodiment 0.002 to 0.01 percent by weight of phosphorus and in another embodiment 0.005 to 0.05 percent by weight of phosphorus. A 0.05 percent by weight phosphorus package corresponds to a typical phosphorus ester level of 0.5 percent by weight in a finished fluid formulation.

The role of the corrosion inhibitor in this invention is to preferentially adsorb onto metal surfaces to provide protective film, or to neutralize corrosive acids. Examples of these include, but are not limited to polyether derived from an ethylene oxide-propylene oxide copolymer, ethoxylates, alkenyl succinic half ester acids, zinc dithiophosphates, metal phenolates, basic metal sulfonates, fatty acids and amines.

Anti-foam agents can be used to reduce or prevent the formation of stable foam include silicones or organic polymers. Examples of these and additional anti-foam compositions are described in "Foam Control Agents", by Henry T. Kerner (Noyes Data Corporation, 1976), pages 125-162.

Pour point depressants can be used to improve the low temperature properties of oil-based compositions. See, for example, page 8 of "Lubricant Additives" by C. V. Smalheer and R. Kennedy Smith (Lezius Hiles Co. publishers, Cleveland, Ohio, 1967). Examples of useful pour point depressants are polymethacrylates; dispersant-polymethacrylates; polyacrylates; polyacrylamides; condensation products of halo-paraffin waxes and aromatic compounds; ethylene vinyl carboxylate copolymers; and terpolymers of dialkylfumarates, vinyl esters of fatty acids and alkyl vinyl ethers. Pour point depressants are described in U.S. Pat. Nos. 2,387,501; 2,015,748; 2,655,479; 1,815,022; 2,191,498; 2,666,746; 2,721,877; 2,721,878; and 3,250,715.

An additional type of pour point depressant is an esterified polymer of maleic anhydride and styrene. These pour point depressants are esters obtained by copolymerizing styrene and maleic anhydride in the presence of a free radical initiator and thereafter esterifying the copolymer with a mixture of C4-18 alcohols also are useful as viscosity modifying additives.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include: hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring); substituted hydrocarbon substituents, that is, substituents containing non-hydrocarbon groups which, in the context of this invention, do not alter the predominantly hydrocarbon nature of the substituent (e.g., halo (especially chloro and fluoro), hydroxy, alkoxy, mercapto, alkylmercapto, nitro, nitroso, and sulfoxy); hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl. In general, no more than two, preferably no more than one, non-hydrocarbon substituent will be present for every ten carbon atoms in the hydrocarbyl group; typically, there will be no non-hydrocarbon substituents in the hydrocarbyl group.

It is known that some of the materials described above may interact in the final formulation, so that the components of the final formulation may be different from those that are initially added. For instance, metal ions (of, e.g., a detergent) can migrate to other acidic or anionic sites of other molecules. The products formed thereby, including the products formed upon employing the composition of the present invention in its intended use, may not be susceptible of easy description. Nevertheless, all such modifications and reaction products are included within the scope of the present invention; the present invention encompasses the composition prepared by admixing the components described above.

EXAMPLES

Example 1 (invention) and Example 2 (comparative) are tested in the Modified Caterpillar™ 1P test. The duration of the test is 288 hours and test engines are run under the following conditions: a speed of 1800 rpm, power of 50 kW, torque 263 Nm, coolant out 90° C., oil 130° C. and air inlet 60° C. The formulations are in Table 1 and the results are found in Table 2.

TABLE 1

| Formulations | | | |
|---|---|---|---|
| Example 1 (invention) Components (oil free basis) | wt. % | Example 2 (comparative) Components (oil free basis) | wt. % |
| Base Oil: Polyalphaolefin | 85.29 | Base Oil: Mineral Oil | |
| Succinimide Dispersant[1] | 7.8 | Conventional Additive Package | 15.05 |
| Pour point depressant | 0.3 | | |
| Amine antioxidant | 0.7 | | |
| Phosphorus anti-wear agent | 0.3 | | |
| Phenol antioxidant | 0.3 | | |
| Polyether corrosion inhibitor | 0.02 | | |
| Ester copolymer anti-foam | 0.09 | | |
| Chemical Analysis | wt. % | Chemical Analysis | wt. % |
| Calcium (%) | ~0 | Calcium (%) | 0.291 |
| Phosphorus (%) | 0.01 | Phosphorus (%) | 0.120 |
| Sulfur (%) | 0.03 | Sulfur (%) | 0.440 |
| Zinc (%) | ~0 | Zinc (%) | 0.135 |
| Sulfated Ash (%) | <0.1 | Sulfated Ash (%) | 1.2 |

[1]The dispersant is derived from the condensation product of 1000 Mn polyisobutylene and tetraethylene pentamine, with a carbonyl to nitrogen ratio of about 0.6

TABLE 2

| Test Results | Example 1 (invention) | Example 2 (comparative) |
|---|---|---|
| Upper Piston Deposit (value > 40 is a fail) | Pass (21.75) | Fail (48) |
| Wear Metals (ppm of Fe) | 31 | 89 |
| Oil Consumption (grams/hr) | 4.8 | 7.6 |
| Particulate Matter (grams) | 0.0027 | 0.0038 |

The results illustrate the advantages of the inventive lubricant composition, which include providing a consumable lubricant which reduces deposit formation, decreases wear in the engine, lowers oil consumption and reduces the formation of particulate matter.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated all percent values are percent by weight an all ppm values are on a weight to weight basis. Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention can be used together with ranges or amounts for any of the other elements. As used herein, the expression "consisting essentially of" permits the inclusion of substances that do not materially affect the basic and novel characteristics of the composition under consideration.

What is claimed is:

1. A method of operating an internal combustion engine, wherein the internal combustion engine is equipped with a pilot ignition system, a lubricating system and a fuel system, comprising:

(i) supplying to said engine's lubricating system a lubricant comprising:
  (a) an oil of lubricating viscosity; and
  (b) a succinimide dispersant with a TBN of at least 80 on a diluent-free basis, in an amount sufficient to provide at least 8 TBN to the lubricant; and
  (c) a combination of (i) an antiwear agent derived from a hydroxycarboxylic acid; (ii) a dispersant viscosity modifier comprising an amine-functionalised additive wherein the additive is derived from an amine having at least 3 aromatic groups, at least one —NH$_2$ functional group, and at least 2 additional amino groups where the groups are secondary and/or tertiary amino groups; (iii) a dispersant viscosity modifier comprising the reaction product of: (a) a polymer comprising carboxylic acid functionality or a reactive equivalent thereof and (b) an amine component comprising at least one aromatic amine containing at least one amino group capable of condensing with said carboxylic acid functionality to provide a pendant group and at least one additional group comprising at least one nitrogen, oxygen, or sulfur atom; (iv) additives obtained from the reaction of: (1) an anthranilic anhydride; (2) a polymer containing an anhydride group, a carboxylic acid group, or an acyl group; and (3) at least one member selected from the group consisting of: an amine wherein the amine contains a primary or secondary amino-group, an alcohol, an aminoalcohol, and a thiol;
  wherein said lubricant has a zinc content of 0 to about 1000 ppm, a percent sulfated ash value of up to about 0.25, a phosphorus content of less than 50 ppm, and a sulfur content of up to about 0.4 percent by weight;
(ii) obtaining a portion of the lubricant from the lubricating system;
(iii) during the pilot ignition phase of the engine's combustion cycle or when a primary fuel is injected into the engine's combustion chambers from the fuel system, injecting the obtained lubricant portion into one or more of the combustion chambers or pre-combustion chambers of the engine in a ratio (by weight) of lubricant to primary fuel from about 0.1:100 to about 10:100.

2. The method of claim 1 wherein:
(i) the lubricant portion is added via a pilot fuel injector; or
(ii) the lubricant portion is mixed with an amount of primary fuel and the mixture is added via a pilot fuel injector; or
(iii) the lubricant portion is mixed with an amount of primary fuel and the mixture is added via a primary fuel injector; or
(iv) combinations thereof.

3. The method of claim 1 wherein the injecting step is performed by: injection into a combustion chamber or pre-combustion chamber, or use of a common rail injection system.

4. The method of claim 1 wherein the portion of lubricant consumed during operation of said engine is replaced by the addition of additional lubricant to the engine's lubricating system.

5. The method of claim 1 wherein the primary fuel is a diesel fuel or a gasoline, where the fuel has a sulfur content of 0 to about 500 ppm.

6. The method of claim 1, wherein the internal combustion engine is equipped with exhaust gas recirculation, at least one exhaust after treatment device, or combinations thereof.

7. The method of claim 1 wherein the internal combustion engine is a heavy duty diesel engine, a light duty diesel engine, a small displacement engine or a stationary diesel engine.

8. The method of claim 1 wherein said succinimide dispersant of the lubricant composition is the product of polyisobutylene succinic anhydride, wherein the polyisobutylene group is derived from polyisobutylene having a number average molecular weight of about 500 to about 3000, condensed with polyethylene amine composition having an average of about 4 to about 6 nitrogen atoms; wherein said dispersant has a nitrogen:carbonyl ratio of at least 1.6; and wherein the amount of said succinimide dispersant is about 1 to 15 percent by weight of the combination of (a) and (b).

9. The method of claim 1 wherein the lubricant composition further comprises an antioxidant; or an anti-wear agent; or a corrosion inhibitor; or a pour point depressant; or a foam inhibitor; or combinations thereof.

10. The method of claim 1 where the oil of lubricating viscosity contains less than 0.03 percent by weight of sulfur.

11. The method of claim 1 wherein the lubricating composition further comprises a viscosity improver.

12. The method of claim 1 wherein the oil of lubricating viscosity comprises a synthetic base oil.

* * * * *